United States Patent
Dallan et al.

(10) Patent No.: US 9,327,914 B1
(45) Date of Patent: May 3, 2016

(54) ROTARY SWEEP ARM SYSTEM

(71) Applicants: R. Michael Dallan, Omaha, NE (US);
David J. Steiner, Omaha, NE (US);
David L. Vance, Fremont, NE (US)

(72) Inventors: R. Michael Dallan, Omaha, NE (US);
David J. Steiner, Omaha, NE (US);
David L. Vance, Fremont, NE (US)

(73) Assignee: MILLARD MANUFACTURING CORP., Omaha, NE (US)

(*) Notice: Subject to any disclaimer, the term of this patent is extended or adjusted under 35 U.S.C. 154(b) by 188 days.

(21) Appl. No.: 13/973,558

(22) Filed: Aug. 22, 2013

(51) Int. Cl.
*B65G 47/00* (2006.01)
*B65G 47/52* (2006.01)

(52) U.S. Cl.
CPC ........................ *B65G 47/52* (2013.01)

(58) Field of Classification Search
CPC .............................. B65G 47/846; B31B 19/94
USPC ................... 198/478.1, 479.1, 482.1
See application file for complete search history.

(56) References Cited

U.S. PATENT DOCUMENTS

| | | | | |
|---|---|---|---|---|
| 4,441,604 A | * | 4/1984 | Schlig | B65G 47/846 198/370.08 |
| 5,039,295 A | * | 8/1991 | Cheung | A21C 11/20 425/241 |
| 5,052,542 A | * | 10/1991 | Wipf | B65G 47/846 198/370.08 |
| 5,052,615 A | * | 10/1991 | Ott | B65G 25/04 206/509 |
| 5,174,429 A | * | 12/1992 | La Vars | B07C 5/362 198/370.02 |
| 5,641,055 A | * | 6/1997 | Anderson | B07B 13/16 198/434 |
| 2011/0070346 A1 | | 3/2011 | Spillner et al. | |
| 2014/0131172 A1 | * | 5/2014 | Greve | B01F 13/0013 198/547 |

* cited by examiner

*Primary Examiner* — Gene Crawford
*Assistant Examiner* — Lester Rushin
(74) *Attorney, Agent, or Firm* — Dennis L. Thomte; Thomte Patent Law Office LLC

(57) ABSTRACT

A rotary sweep arm system for use with a food product classifier line conveyor. The sweep arm system sweeps selected food products from the conveyor to a selected food product receiving station such as a conveyor, container, or a trimming station.

2 Claims, 5 Drawing Sheets

ROTARY SWEEP ARM SYSTEM

BACKGROUND OF THE INVENTION

1. Field of the Invention

This invention relates to a rotary sweep arm system and more particularly to a rotary sweep arm system for use with a food product, such as meat, classifier line conveyor.

2. Description of the Related Art

In the processing of meat products such as pork loins, hams, ribs, etc., the products must have consistent weights, thicknesses, etc. To that end, classifier lines are utilized to sort out or select those products which do not meet the prescribed weight, thickness, etc., or any other criteria. In some classifier lines, the products are placed on a longitudinally extending belt conveyor in a horizontally spaced-apart manner. The conveyor belt is then moved past personnel stations wherein the products are hand weighed and/or measured and removed from the belt conveyor and placed in a container or transferred to a trimming station or the like if the product does not meet the prescribed standards.

In recent years, the products moving along the classifier line conveyor are automatically weighed or measured. If the product is sensed or selected for removal from the classifier line conveyor, the product is manually removed from the conveyor belt. In some cases, a pneumatic cylinder, having an extendable and retractable cylinder rod, with a pusher plate on the outer end thereof, is transversely disposed with respect to the conveyor and is activated to push the selected product laterally from the conveyor. The product is pushed from the conveyor as the cylinder rod is extended. Once the cylinder rod has been extended to push the product from the conveyor, the cylinder rod must be retracted which requires some time, however small. In situations as just described, the product may be damaged by the cylinder rod pusher plate coming into contact with the product due to the quick straight line action thereof.

SUMMARY OF THE INVENTION

This Summary is provided to introduce a selection of concepts in a simplified form that are further described below in the Detailed Description. This Summary is not intended to identify key aspects or essential aspects of the claimed subject matter. Moreover, this Summary is not intended for use as an aid in determining the scope of the claimed subject matter.

A rotary sweep arm system is disclosed which is designed to be used with a food product, such as meat, classifier line conveyor. The conveyor is horizontally disposed and has an input end and a discharge end. The conveyor is configured to have individual food products such as beef or pork placed thereon in a horizontally spaced-apart manner. A housing is positioned above the conveyor intermediate the input end and the discharge end of the conveyor. The housing has an input end, an output end, a first side and a second side. A selected product receiving station is positioned at the first side of the housing and is positioned laterally of the conveyor. A product side-kicker assembly, which comprises a rotary sweep arm system, is mounted in the housing which engages a selected product on the conveyor, as the selected product moves through the housing, and which moves the selected product laterally from the first side of the conveyor to the selected product receiving station.

In one embodiment, the selected product receiving station comprises a conveyor which extends outwardly from the housing. In another embodiment, the selected product receiving station comprises a table. In yet another embodiment, the selected product receiving station comprises a container. In even a further embodiment, the selected product receiving station comprises a trimming station. The sweep arm system includes an elongated, horizontally disposed shaft, having first and second ends, which rotatably extends between the input end and the output end of the housing. An air clutch is coupled to the shaft. An electric motor is coupled to the air clutch and sequentially rotates the shaft 180 degrees. The electric motor operates continuously and the air clutch sequentially rotates the shaft 180 degrees. A plurality of horizontally spaced-apart disc-shaped supports are mounted on the shaft for rotation therewith. Each of the disc-shaped supports have a first elongated paddle support extending radially outwardly therefrom. Each of the first paddle supports have inner and outer ends and are parallel to one another. A first elongated paddle is secured to the outer ends of the first paddle supports and extends therebetween parallel to the shaft. Each of the disc-shaped supports have a second elongated paddle support extending radially outwardly therefrom. Each of the second paddle supports have inner and outer ends and are parallel to one another. The second paddle supports are radially spaced 180 degrees apart from the first paddle supports. A second elongated paddle is secured to the outer ends of the second paddle supports and extends therebetween parallel to the shaft. The shaft is rotatably moved 180 degrees between first and second positions by the air clutch. The first paddle is positioned in a ready position when the shaft is in the first position. The second paddle is positioned in a stand-by position when the shaft is in the second position. The rotational movement of the shaft from the first position to the second position causes the first paddle to move from the ready position towards the stand-by position and sweep the selected food product from the conveyor to the selected product receiving station. The rotational movement of the shaft from the first position to the second position causes the second paddle to move from the stand-by position to the ready position.

It is a principal object of the invention to provide an improved means for moving selected products from a classifier line to a selected product receiving station.

A further object of the invention is to provide an invention of the type described which includes a rotary sweep arm system.

A further object of the invention is to provide an invention of the type described which utilizes a rotary action to move selected products from a classifier line conveyor to a selected product receiving station.

A further object of the invention is to provide an invention of the type described wherein the paddles thereof may be customized.

A further object of the invention is to provide a system of the type described wherein the rotary sweep arm system may have a variable speed.

A further object of the invention is to provide a rotary sweep arm system for use with a meat product classifier line conveyor which is much faster than conventional systems and which does not damage the product as the sweep arm system moves the selected product from the classifier line conveyor to the selected product receiving station.

These and other objects will be apparent to those skilled in the art.

BRIEF DESCRIPTION OF THE DRAWINGS

Non-limiting and non-exhaustive embodiments of the present invention are described with reference to the follow

DESCRIPTION OF THE PREFERRED EMBODIMENT

Embodiments are described more fully below with reference to the accompanying figures, which form a part hereof and show, by way of illustration, specific exemplary embodiments. These embodiments are disclosed in sufficient detail to enable those skilled in the art to practice the invention. However, embodiments may be implemented in many different forms and should not be construed as being limited to the embodiments set forth herein. The following detailed description is, therefore, not to be taken in a limiting sense in that the scope of the present invention is defined only by the appended claims.

Figure 1:
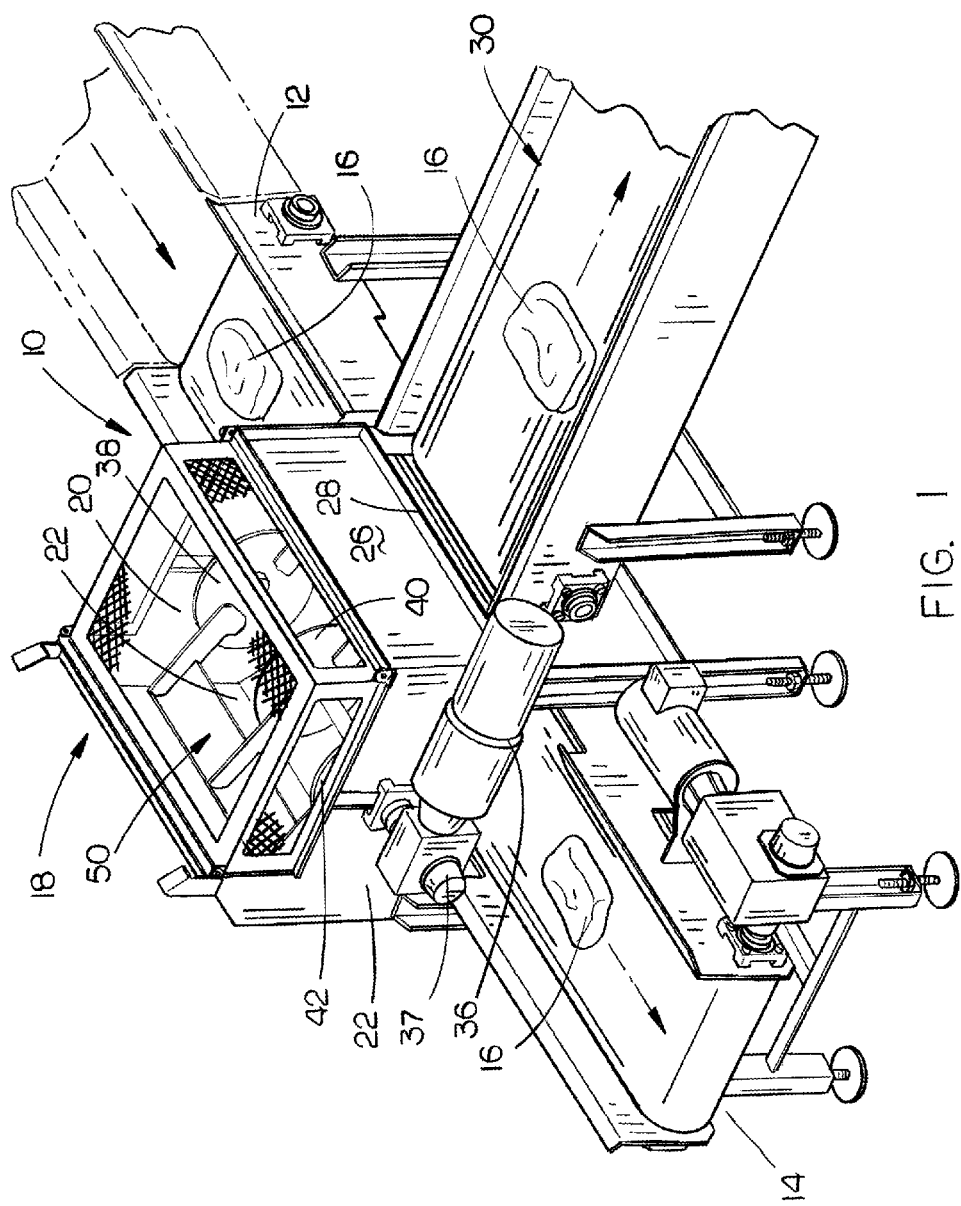
- FIG. 1 is a partial perspective view of the rotary sweep arm system of this invention being used with a meat product classifier line conveyor.

In FIG. 1, the numeral 10 refers to an elongated horizontally disposed conveyor having an input end 12 and a discharge end 14. The conveyor 10 is conventional in design and is designed to convey horizontally spaced-apart food product 16 such as pork loins, hams, ribs and bellies as well. The conveyor 10 is what is known as a classifier line which includes conventional classifiers that automatically weigh and measure the food product or determine if the product should be selectively removed from the classifier line conveyor. If the food product does not conform to the programmed specifications, it must be diverted from the conveyor 10 for further processing such as trimming, etc. The problem in the art is to provide a means for diverting the selected food product from the conveyor 10 by means other than manual diversion to a trimming station, container or table.

The numeral 18 refers to a housing, cabinet or enclosure which is provided adjacent the conveyor 10 after the classifying means has determined that an individual food product 16 has not met the desired specifications relating to weight, measurement, etc., or is selected for other reasons. Housing 18 includes a front wall 20, a back wall 22, a first side wall 24 and a second side wall 26. The lower ends of front wall 20 and back wall 22 are disposed above the upper side of the conveyor 10 so that the food product 16 on the conveyor may pass underneath those lower ends. The lower end 28 of side wall 26 is disposed above the upper side of the conveyor 10 so that the selected food product 16 may pass underneath that lower end. In the drawings, the numeral 30 refers to a conveyor which extends outwardly from the conveyor 10 beneath the lower end 28 of the side wall 26. Although a conveyor 30 is shown in the drawings, the conveyor 30 could be replaced by a trimming station, a table or a container for the selected product 16 to be further processed. The upper open end of housing 18 is selectively closable by a pivotal lid or cover 32.

Figure 2:
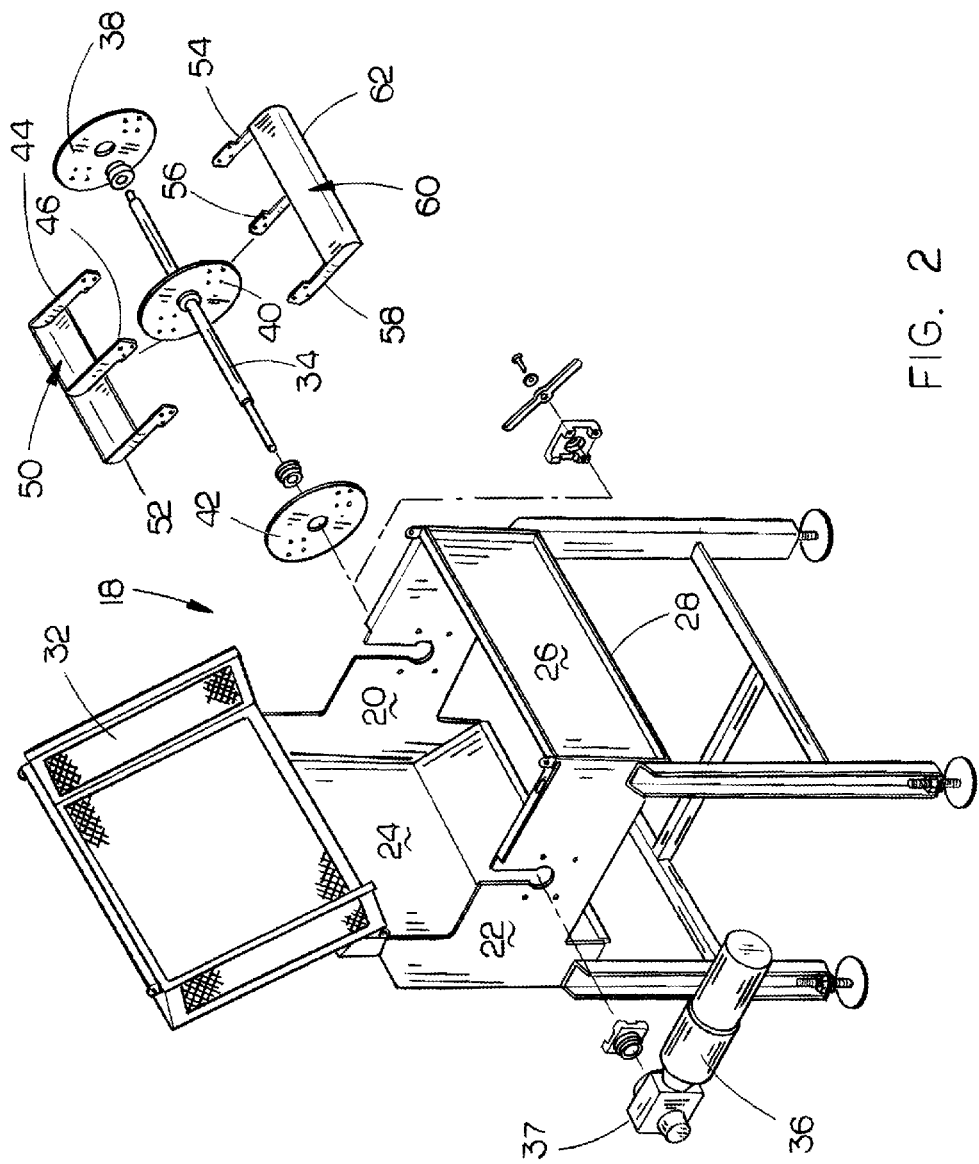
FIG. 2 is an exploded perspective view of the sweep arm system of this invention.

The numeral 34 refers to an elongated, longitudinally extending rotatable shaft which is rotatably mounted in front wall 20 and back wall 22, as seen in FIG. 2. The back end of shaft 24 is driven by an air clutch 37 which is driven by an electric motor 36. Motor 36 runs continuously with air clutch 37 sequentially rotating the shaft 34 180 degrees. Three disc-shaped plates 38, 40 and 42 are mounted on shaft 34 for rotation therewith with the plates 38, 40 and 42 being horizontally spaced apart.

Figure 4:
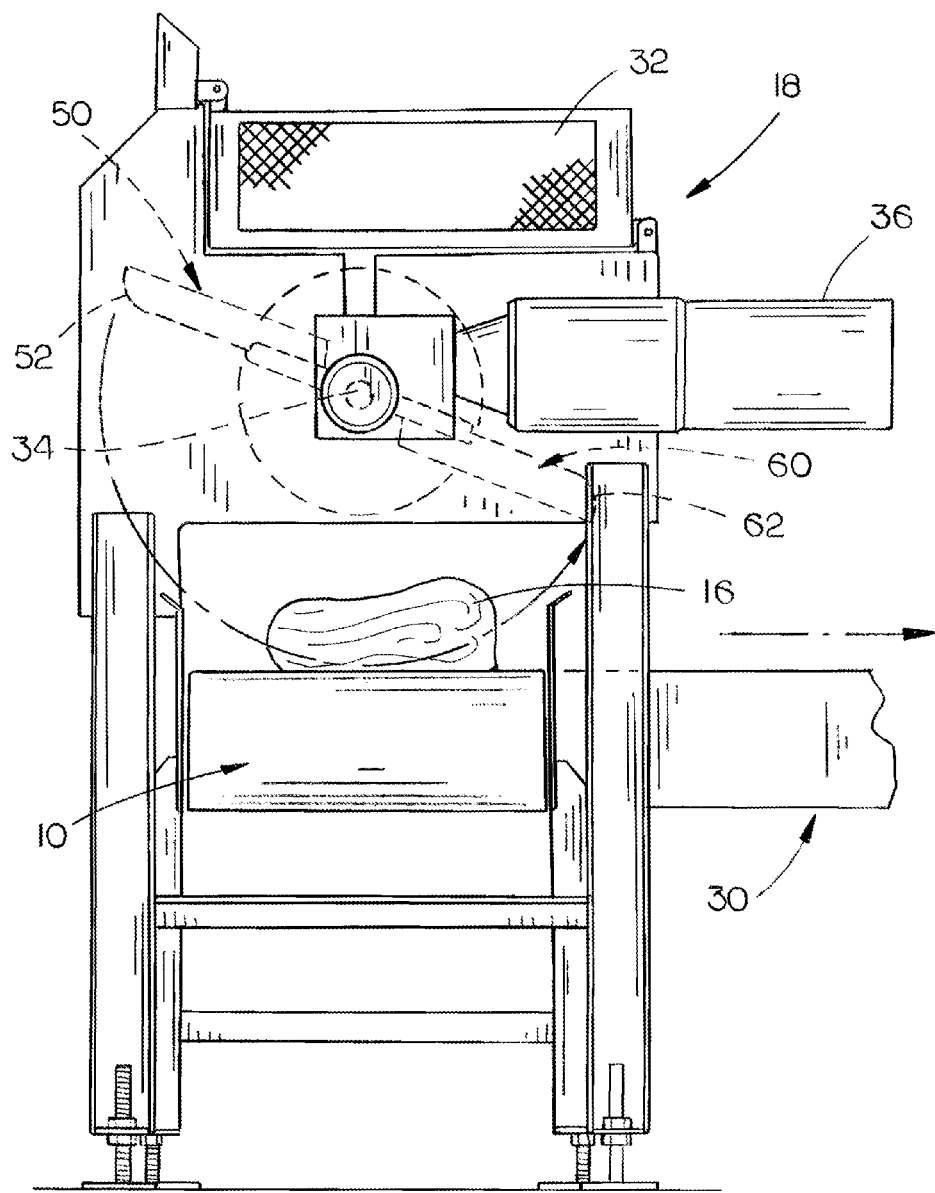
FIG. 4 is an end elevational view of the rotary sweep arm system of this invention.
Figure 5:
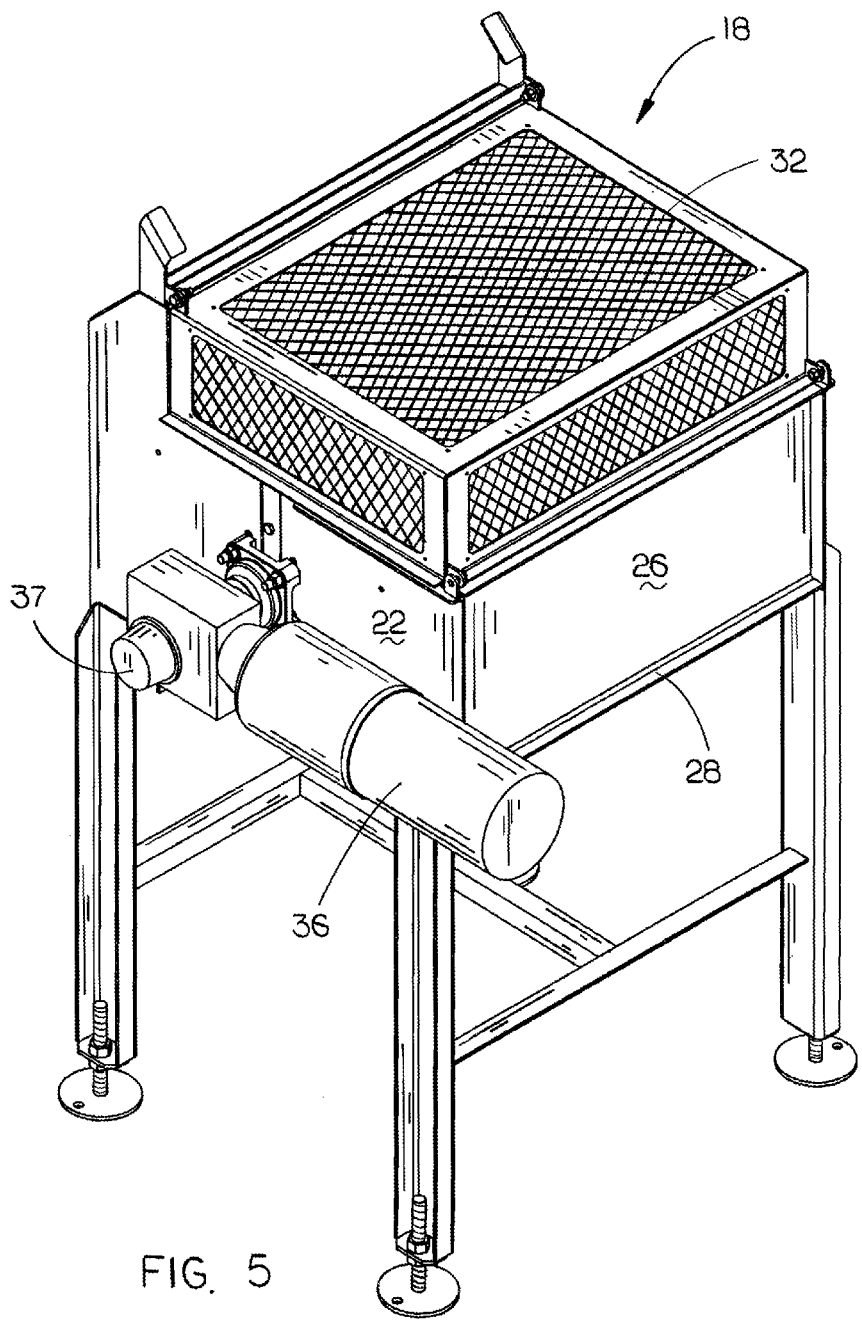
FIG. 5 is a perspective view of the sweep arm system of this invention with the cover thereof being in a closed position.

Arms 44, 46 and 48 have their inner ends secured to plates 38, 40 and 42 respectively and extend radially outwardly therefrom. An elongated kicker paddle 50 is secured to the outer ends of arms 44, 46 and 48 and extends therebetween, as seen in FIG. 2. As seen in FIG. 4, paddle 50 has an arcuate or curved leading side 52.

Arms 54, 56 and 58 have their inner ends secured to plates 38, 40 and 42 respectively and extend radially outwardly therefrom. The arms 54, 56 and 58 extend from plates 38, 40 and 42 respectively 180 degrees from arms 44, 46 and 48. An elongated kicker paddle 60 is secured to the outer ends of arms 54, 56 and 58 and extends therebetween, as seen in FIG. 2. As seen, paddle 60 has an arcuate or curved leading side 62.

Figure 3:
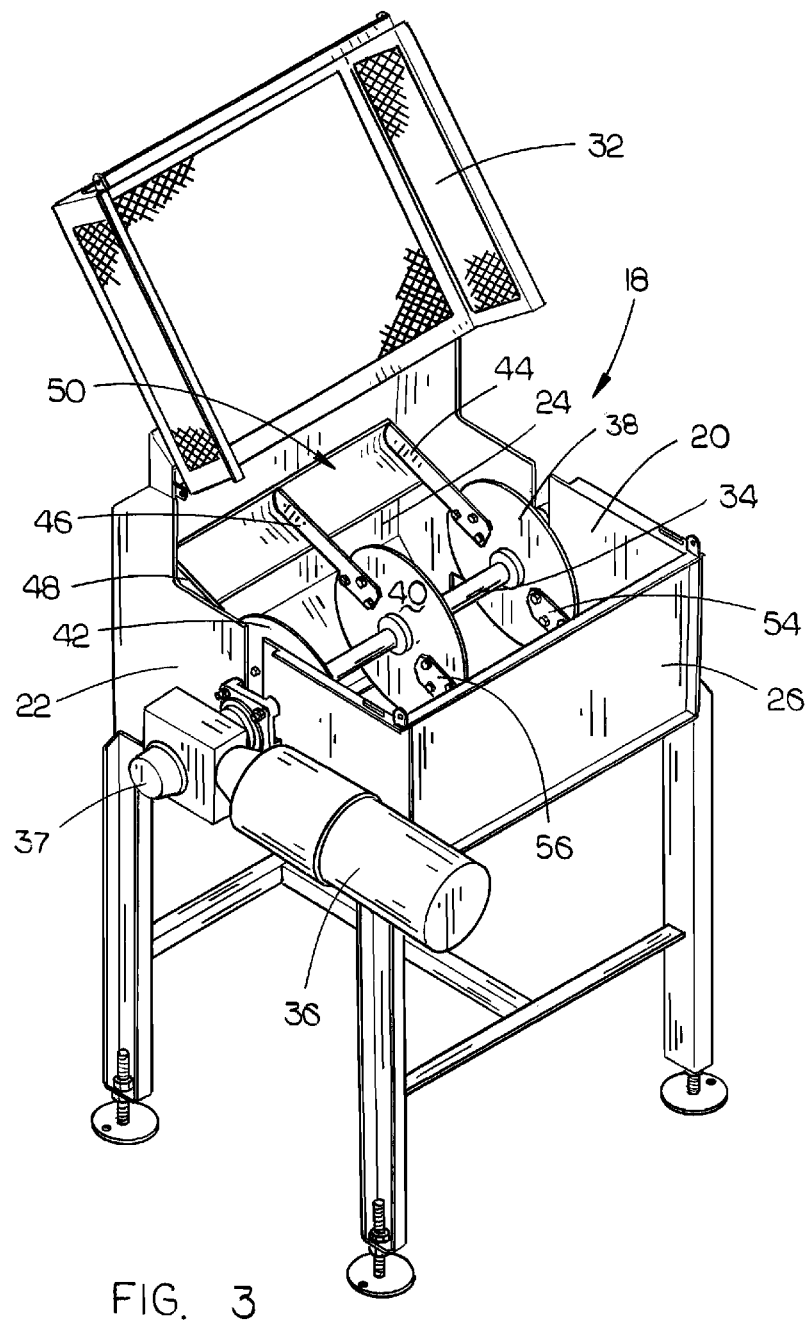
FIG. 3 is a perspective view of the rotary sweep arm system of this invention with the cover of the housing being in an open position.

In use, the conveyor 10 is activated and the food products 16 are placed on the conveyor 10 in a spaced-apart relationship. Conventional classifiers scan the food product 16 to determine if the food product 16 meets the prescribed specification or if the food product is to be selectively removed from the conveyor 10. As the food product 16 enters the housing 18, the paddle 50 will be in ready position of FIGS. 1, 3 and 4 and the paddle 60 will be in the stand-by position of FIG. 4. If a product 16 is selected by the classifier, air clutch 37 is activated which causes the shaft 34 to be rotated 180 degrees. The rotation of the shaft 34 180 degrees causes the paddle 50 to move downwardly and laterally to sweep the selected food product 16 laterally from the conveyor 10 to the selected food product receiving station. As the paddle 50 moves from its ready position to the sweeper position and then to its stand-by position, the paddle 60 will move from the stand-by position to the ready position. The sweeping action is extremely fast since there is always a paddle in a ready position with the other paddle being in a stand-by position. When the paddles are in the ready position and stand-by position, they do not interfere with the passage of the food products therebelow. The paddles 50 and 60 may be customized for different food products. The paddles sweep into contact with the food product to quickly sweep the selected food product from the conveyor 12 without damaging the food product.

Thus it can be seen that the system of this invention accomplishes at least all of its stated objectives.

Although the invention has been described in language that is specific to certain structures and methodological steps, it is to be understood that the invention defined in the appended claims is not necessarily limited to the specific structures and/or steps described. Rather, the specific aspects and steps are described as forms of implementing the claimed invention. Since many embodiments of the invention can be practiced without departing from the spirit and scope of the invention, the invention resides in the claims hereinafter appended.

We claim:
1. In combination;
an elongated, horizontally disposed conveyor having an input end and a discharge end;
said conveyor being configured to have individual food products placed thereon in a horizontally spaced-apart manner;
a housing including horizontally spaced-apart first and second upstanding end walls, having upper and lower ends, and horizontally spaced-apart first and second upstand- ing side walls, having upper and lower ends, which extend between said first and second end walls;

said lower ends of said first end wall, said first side wall and said second end wall being spaced above said conveyor to enable the food products on said conveyer to pass beneath said lower ends of said first end wall, said first side wall and said second end wall;

an elongated, horizontally disposed shaft, having first and second ends, which rotatably extends between said first and second end walls above said conveyor;

an air clutch coupled to said shaft for sequentially rotating said shaft 180 degrees;

a continuously operated electric motor coupled to said air clutch;

a plurality of horizontally spaced-apart supports mounted on said shaft for rotation therewith;

each of said supports having a first elongated paddle support extending radially outwardly therefrom;

each of said first paddle supports having inner and outer ends;

said first paddle supports being parallel to one another;

a first elongated paddle secured to said outer ends of said first paddle supports and extending therebetween parallel to said shaft;

each of said supports having a second elongated paddle support extending radially outwardly therefrom;

each of said second paddle supports having inner and outer ends;

said second paddle supports being parallel to one another;

said second paddle supports being radially spaced 180 degrees from said first paddle supports;

a second elongated paddle secured to said outer ends of said second paddle supports and extending therebetween parallel to said shaft;

said shaft said first and second paddles being interchangeably customizable for different food products being operatively rotatably moved 180 degrees between first and second positions by said air clutch;

said first paddle being positioned inwardly of said first side wall in a ready position when said shaft is in said first position;

said second paddle being positioned inwardly of said second side wall in a stand-by position when said shaft is in said first position;

the rotational movement of said shaft from said first position to said second position causing said first paddle supports to be rotated 180 degrees thereby causing said first paddle to rotatably move 180 degrees from said ready position towards said stand-by position and sweep the selected food product from said conveyor to a selected product receiving station;

the rotational movement of said shaft from said first position to said second position causing said second paddle supports to be rotated 180 degrees thereby causing said second paddle to rotatably move 180 degrees from said stand-by position to said ready position;

said first paddle being in a stand-by position when said shaft is in said second position.

2. The combination of claim 1 wherein each of said first and second paddles has a curved product engaging face.

* * * * *